United States Patent
Brew et al.

(10) Patent No.: US 11,534,937 B2
(45) Date of Patent: Dec. 27, 2022

(54) EXTRUSION DIES

(71) Applicant: CORNING INCORPORATED, Corning, NY (US)

(72) Inventors: Thomas William Brew, Corning, NY (US); Yuehao Li, Painted Post, NY (US); Kenneth Charles Sariego, Beaver Dams, NY (US); Min Shen, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 160 days.

(21) Appl. No.: 16/955,137

(22) PCT Filed: Dec. 11, 2018

(86) PCT No.: PCT/US2018/065005
§ 371 (c)(1),
(2) Date: Jun. 18, 2020

(87) PCT Pub. No.: WO2019/125830
PCT Pub. Date: Jun. 27, 2019

(65) Prior Publication Data
US 2020/0316814 A1 Oct. 8, 2020

Related U.S. Application Data

(60) Provisional application No. 62/609,477, filed on Dec. 22, 2017, provisional application No. 62/609,485, filed on Dec. 22, 2017.

(51) Int. Cl.
B28B 3/26 (2006.01)
B29C 48/11 (2019.01)
(Continued)

(52) U.S. Cl.
CPC ............ *B28B 3/269* (2013.01); *B29C 48/022* (2019.02); *B29C 48/11* (2019.02); *B29C 48/30* (2019.02);
(Continued)

(58) Field of Classification Search
CPC ... B28B 3/269; B28B 2003/203; B29C 48/11; B29C 48/30; F01N 3/2828
See application file for complete search history.

(56) References Cited

U.S. PATENT DOCUMENTS 4,259,057 A * 3/1981 Abe .................. B28B 3/269
425/464
4,298,328 A 11/1981 Frost
(Continued)

FOREIGN PATENT DOCUMENTS

JP 54-007252 A 1/1979
JP 63-019205 A 1/1988
(Continued)

OTHER PUBLICATIONS

International Search Report and Written Opinion of the International Searching Authority; PCT/US2018/065005; dated May 17, 2019; 21 Pages; European Patent Office.

*Primary Examiner* — Xiao S Zhao
*Assistant Examiner* — Joseph S Leyson
(74) *Attorney, Agent, or Firm* — Joseph M. Homa

(57) ABSTRACT

A honeycomb extrusion die body (401) including inlet (414) and exit (402) faces, and a plurality of pins (406) on the exit face (402) defining a matrix of intersecting wide slots (425) and narrow slots (427). The wide slots (425) have an exit width (W1) greater than an exit width (W2) of the narrow slots (427). The die body (401) further includes feedholes (422) at the inlet face (414) and intersecting with inlet portions (416) to the wide slots (425) and/or the narrow slots
(Continued)

(427). Some of the pins (406) defining the wide slots (425) include a first surface indentation feature (430) that is (i) located between the inlet portion (416) and the wide slot exit and (ii) spaced away from the wide slot exit. Some of the pins (406) defining the narrow slots (427) include a second surface indentation feature (434) that is (i) located between the inlet portion and the narrow slot exit and (ii) spaced away from the narrow slot exit.

19 Claims, 10 Drawing Sheets

(51) Int. Cl.
  *B29C 48/30* (2019.01)
  *B29C 48/32* (2019.01)
  *B29C 48/345* (2019.01)
  *B29C 48/00* (2019.01)
  *B01D 46/24* (2006.01)
  *B01D 53/94* (2006.01)
  *B01J 35/04* (2006.01)
  *B28B 3/20* (2006.01)
  *F01N 3/28* (2006.01)

(52) U.S. Cl.
  CPC ............ *B29C 48/32* (2019.02); *B29C 48/345* (2019.02); *B01D 46/2418* (2013.01); *B01D 53/94* (2013.01); *B01D 2255/9155* (2013.01); *B01D 2279/30* (2013.01); *B01J 35/04* (2013.01); *B23H 2200/30* (2013.01); *B28B 2003/203* (2013.01); *F01N 3/2828* (2013.01); *F01N 2330/06* (2013.01); *F01N 2330/48* (2013.01)

(56) References Cited

U.S. PATENT DOCUMENTS

| | | | |
|---|---|---|---|
| 4,349,329 A | | 9/1982 | Naito et al. |
| 4,902,216 A | * | 2/1990 | Cunningham .......... B28B 3/269 264/177.12 |
| 5,238,386 A | * | 8/1993 | Cunningham .......... B28B 3/269 425/467 |
| 6,080,348 A | * | 6/2000 | Shalkey .................. B28B 3/269 264/630 |
| 2003/0064126 A1 | * | 4/2003 | Miyazaki ................. B23H 9/00 425/461 |
| 2011/0278753 A1 | | 11/2011 | Breuer et al. |

FOREIGN PATENT DOCUMENTS

| | | |
|---|---|---|
| JP | 2010-228290 A | 10/2010 |
| KR | 10-2012-0063978 A | 6/2012 |
| WO | 99/20445 A1 | 4/1999 |

* cited by examiner

EXTRUSION DIES

CROSS-REFERENCE TO RELATED APPLICATIONS

This application is a National Stage application under 35 U.S.C. § 371 of International Application No. PCT/US2018/065005 filed on Dec. 11, 2018 which claims the benefit of priority under 35 U.S.C. § 119 to U.S. Provisional Application Ser. No. 62/609,477 filed on Dec. 22, 2017 and to U.S. Provisional Application Ser. No. 62/609,485, filed Dec. 22, 2017, the contents of which are relied upon and incorporated herein by reference in their entirety entireties.

FIELD

This disclosure relates to a honeycomb extrusion dies and methods of making honeycomb bodies, more particularly, to honeycomb extrusion dies configured to extrude ceramic-forming mixtures, and to methods of making honeycomb bodies comprising alternating web thickness using the extrusion die bodies.

BACKGROUND

Ceramic honeycomb bodies with thin web thicknesses can be utilized in exhaust aftertreatment systems.

SUMMARY

Illustrative embodiments of the present disclosure are directed to honeycomb extrusion dies and an extrusion apparatus, including a honeycomb extrusion die, comprising: a die body comprising: an inlet face; an exit face; a plurality of pins disposed on the exit face and arranged to define a matrix of intersecting wide slots and narrow slots formed therebetween, wherein the wide slots have a wide slot exit width greater than a narrow slot exit width of the narrow slots; and feedholes at the inlet face and intersecting with inlet portions to at least one of the wide slots and the narrow slots; wherein at least some of the pins that define the wide slots comprise a first surface indentation feature that is (i) located between the inlet portion and a wide slot exit of a wide slot and (ii) spaced away from the wide slot exit; and wherein at least some of the pins that define the narrow slots comprise a second surface indentation feature that is (i) located between the inlet portion and a narrow slot exit of a narrow slot and (ii) is spaced away from the narrow slot exit.

In some embodiments, some of the feedholes intersect with at least some of the wide slots and some of the feedholes intersect with at least some of the narrow slots.

In some embodiments, the plurality of pins is arranged in a repeating pattern of a plurality of enclosed pin blocks.

In some embodiments, each enclosed pin block defines narrow slots and at least partially defines wide slots.

In some embodiments, each enclosed pin block comprises a plurality of pins that define a subset of the narrow slots and that do not define any of the wide slots.

In some embodiments, each enclosed pin block further comprises a plurality of pins that define both a second subset of the narrow slots and a subset of the wide slots.

In some embodiments, each closed extrusion pin block has a periphery that is defined by wide discharge slots.

In some embodiments, the feedholes comprise first feedholes intersecting inlet portions to the wide slots, and second feedholes intersecting inlet portions to the narrow slots.

In some embodiments, the first surface indentation features are deeper than the second surface indentation features.

In some embodiments, the first surface indentation feature is spaced away from the wide slot exit and away from an inlet portion of a respective wide slot.

In some embodiments, the second surface indentation feature is spaced away from the narrow slot exit and extends to an inlet portion of the narrow slot.

In some embodiments, at least some of the wide slots intersect with other narrow slots along wide-narrow slot intersections.

In some embodiments, the feedholes are spaced away from the wide-narrow slot intersections.

In some embodiments, the feedholes are located between the wide-narrow slot intersections.

In some embodiments, the feedholes are spaced away from the narrow-narrow slot intersections.

In some embodiments, the feedholes are located between the narrow-narrow slot intersections.

In some embodiments, the feedholes are spaced away from intersections between any slot intersections.

In some embodiments, the feedholes are located between slot intersections.

In some embodiments, adjacent pins comprise opposing first surface indentation features or opposing second surface indentation features.

In some embodiments, the die body has two narrow slots for every wide slot.

In some embodiments, the wide slot exit width is three times greater, or more, than the narrow slot exit width.

In some embodiments, the wide slot exit width is four times greater, or more, than the narrow slot exit width.

In some embodiments, one or more wide slots comprise a first portion extending between wide slot exits and the first surface indentation feature and a second portion extending between inlet portions of the wide slots and the first surface indentation feature, wherein a width of the first portion is greater than a width of the second portion.

Illustrative embodiments are also directed to another honeycomb extrusion die, comprising: a die body comprising: an inlet face; an exit face; a plurality of pins disposed on the exit face and arranged to define a matrix of intersecting wide slots and narrow slots formed therebetween, wherein the wide slots have a wide slot exit width greater than a narrow slot exit width of the narrow slots; and feedholes at the inlet face and intersecting with inlet portions to at least one of the wide slots and the narrow slots; wherein at least some of the pins that define the wide slots comprise a first surface indentation feature that is (i) located between the inlet portion and a wide slot exit of a wide slot and (ii) is spaced away from the wide slot exit; wherein at least some of the pins that define the narrow slots comprise a second surface indentation feature that is (i) located between the inlet portion and a narrow slot exit of a narrow slot and (ii) is spaced away from the narrow slot exit; and wherein the matrix of intersecting wide slots and narrow slots form at least one enclosure of wide slots enclosing at least one narrow slot.

In some embodiments, a first group of narrow slots in the at least one enclosure extends in a first direction and wherein a second group of narrow slots in the at least one enclosure extends in a second direction.

In some embodiments, one or more wide slots comprise a first portion extending between wide slot exits and the first surface indentation feature and a second portion extending between inlet portions of the wide slots and the first surface indentation feature, wherein a width of the first portion is greater than a width of the second portion.

Further illustrative embodiments of the present disclosure are directed to a honeycomb extrusion die, comprising: a die body comprising: an inlet face; an exit face; a plurality of pins disposed on the exit face and arranged to define a matrix of intersecting wide slots and narrow slots formed therebetween, wherein the wide slots having a wide slot exit width greater than a narrow slot exit width of the narrow slots; and feedholes at the inlet face and intersecting with inlet portions to at least one of the wide slots and the narrow slots; wherein at least some of the pins that define the wide slots comprise a first surface indentation feature that is (i) located between the inlet portion and a wide slot exit of a wide slot and (ii) spaced away from the wide slot exit, a first portion extending between the wide slot exit and the first surface indentation feature and a second portion extending between the inlet portion of the wide slot and the first surface indentation feature, wherein a width of the first portion is greater than a width of the second portion; and wherein at least some of the pins that define the narrow slots comprise a second surface indentation feature that is (i) located between the inlet portion and a narrow slot exit of a narrow slot and (ii) spaced away from the narrow slot exit, the first surface indentation feature extending deeper than the second surface indentation feature, and the second surface indentation feature is spaced away from the narrow slot exit and extends to the inlet portion of the narrow slot.

Yet further illustrative embodiments are directed to an extrusions apparatus comprising: a honeycomb extrusion die, comprising: a die body comprising: an inlet face; an exit face; a plurality of pins disposed on the exit face and arranged to define a matrix of intersecting wide slots and narrow slots formed therebetween, wherein the wide slots have a wide slot exit width greater than a narrow slot exit width of the narrow slots; feedholes at the inlet face and intersecting with inlet portions to at least one of the wide slots and the narrow slots; an impedance plate disposed adjacent to the inlet face of the die body; wherein the impedance plate comprises: an entrance face; an exit face, and entrance openings in the entrance face extending through the impedance plate to the exit face to form a plurality of impedance holes, wherein at least one impedance hole corresponds to at least one feedhole in the die body.

In some embodiments, the plurality of impedance holes comprises a first set of holes with a first radius and a second set of holes with a second radius, wherein the first radius is different from the second radius.

In some embodiments, the plurality of impedance holes comprises a first set of holes with a first length and a second set of holes with a second length, wherein the first length is different from the second length.

In some embodiments, the impedance plate at least partially blocks at least one feedhole in the die body.

In some embodiments, at least some of the pins that define the wide slots comprise a first surface indentation feature that is (i) located between the inlet portion and a wide slot exit of a wide slot and (ii) spaced away from the wide slot exit.

In some embodiments, at least some of the pins that define the narrow slots comprise a second surface indentation feature that is (i) located between the inlet portion and a narrow slot exit of a narrow slot and (ii) spaced away from the narrow slot exit.

Additional features of the disclosure will be set forth in the description which follows; and in part will be apparent from the description, or may be learned by practice of the disclosure. It is to be understood that both the foregoing general description and the following detailed description provide examples and are explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate example embodiments of the disclosure, and together with the description serve to explain the principles of the disclosure.

DETAILED DESCRIPTION

Figure 1:
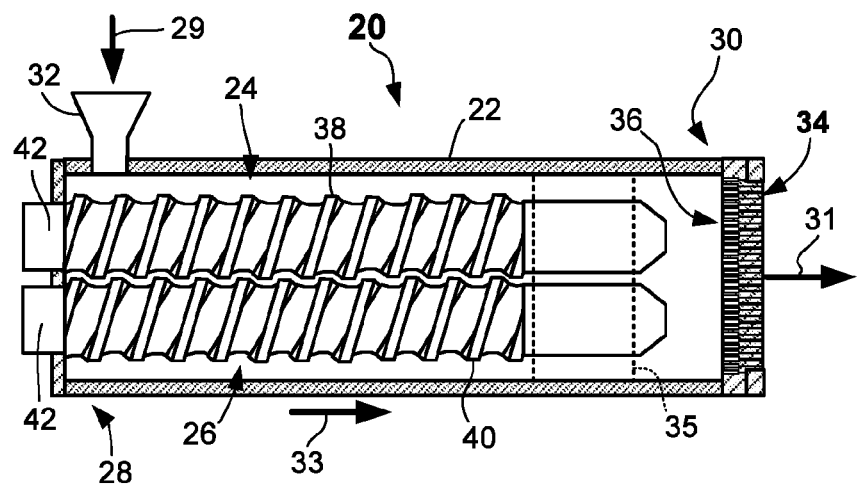
FIG. 1 illustrates a schematic cross-sectioned diagram of a twin-screw extruder machine (TSM) according to embodiments of the disclosure.

It will be understood that for the purposes of this disclosure, "at least one of X, Y, and Z" can be construed as X only, Y only, Z only, or any combination of two or more items X, Y, and Z (e.g., XYZ, XYY, YZ, ZZ).

After-treatment of exhaust gas from internal combustion engines may use catalysts supported on high-surface area substrates and, in the case of diesel engines and some gasoline direct injection engines, a catalyzed or uncatalyzed filter for the removal of particles. Filters and catalyst supports in these applications may be refractory, thermal shock resistant, stable under a range of oxygen pressure conditions, non-reactive with the catalyst system, and offer relatively-low resistance to exhaust gas flow. Porous ceramic flow-through honeycomb substrates and wall-flow honeycomb filters generically referred to herein as honeycomb bodies may be used in these applications.

A honeycomb body can be formed from a ceramic-forming mixture, comprising, for example, ceramic-forming material that may comprise ceramics or ceramic precursors, or both, and optional pore formers, rheology modifiers, liquid vehicle, and the like, and combinations thereof. When fired, the ceramic-forming mixture is transformed or sintered into a porous ceramic material, for example, a porous ceramic honeycomb suitable for exhaust treatment purposes. The ceramic may be cordierite, silicon carbide, silicon nitride, aluminum titanate, alumina, mullite, combinations thereof, and the like.

The honeycomb body can be formed by an extrusion process where a ceramic-forming mixture is extruded into a wet green honeycomb, dried, and fired to form the final ceramic body. The extrusion can be performed using a hydraulic ram extrusion press, a two-stage de-airing single auger extruder, or a twin-screw extruder with an extrusion die provided in a die assembly attached to the discharge end. Other suitable extruding devices comprising extrusion dies may be used.

Honeycomb extrusion dies employed to produce such honeycomb bodies can be multi-component assemblies comprising, for example, a web-forming die body combined with a skin-forming mask. For example, U.S. Pat. Nos. 4,349,329 and 4,298,328 describe die structures comprising skin-forming masks. The die body preferably incorporates ceramic-forming mixture feedholes leading to, and intersecting with, an array of slots formed in the die face, through which the material is extruded. The extrusion forms an interconnecting array of crisscrossing webs forming a cellular honeycomb body. A skin-forming mask can be employed to form an outer peripheral skin, and the mask can be a ring-like circumferential structure, such as in the form of a collar, defining the periphery of the skin of the honeycomb body. The circumferential skin layer of the honeycomb article can be formed by extruding the ceramic-forming mixture between the mask and the die body.

The extruded green material can be cut lengthwise to create honeycomb bodies such as to form honeycomb substrate bodies shaped and sized to meet the specifications of engine manufacturers. The extruded green material can alternatively be in the form of honeycomb segments, which can be connected or bonded together to form the final honeycomb bodies. These extruded green honeycomb bodies can be made in any size or shape.

As a ceramic honeycomb body is extruded, an external extruded surface such as a solid external surface can be provided along the length of the honeycomb body. Under certain circumstances, it may become necessary to remove the external surface. For example, a green extruded honeycomb body may be shaped to a desired shape and size by removing the extruded external surface. Alternatively, the green honeycomb body may be fired and then ground to the desired shape and size by removing the external extruded surface and any portion of the porous wall structure to attain the desired final shape and size. Shaping can be accomplished by any means known in the art, comprising cutting, sanding, or grinding away the outer extruded surface of the honeycomb body to achieve the desired shape and size.

Honeycomb body segments may also be shaped to a desired shape and size by removing the extruded external surface before assembling the segments into the final honeycomb body. Alternatively, the honeycomb body segments may be integrated to form a honeycomb body structure and the periphery shaped to the desired shape and size of the final honeycomb body.

After the desired shape and size has been attained, a skin material can be applied to an outer periphery of the sized honeycomb body to form a new external surface, or skin, on the body. In some embodiments, the ends of the honeycomb body are not covered with the skin material, although certain passages may be plugged, if desired. After the skin composition has been applied to the honeycomb body, the skin composition can be dried and/or calcined. In some embodiments, a cold-set cement composition can be applied to the honeycomb body. In some embodiments, the honeycomb body over which the cement is applied comprises fired ceramic material. In other embodiments, the honeycomb body over which the cement is applied comprises a green body or a calcined body. In some embodiments, final firing of the honeycomb body can take place during the catalyzation process.

FIG. 1 depicts an example embodiment of a continuous twin-screw extruder machine (TSM) 20. The twin-screw extruder machine 20 comprises a barrel 22 comprising chamber portions 24, 26 formed therein and in communication with each other. The barrel 22 can be monolithic or it can be formed from a plurality of barrel segments connected successively in the longitudinal (i.e., axial) direction. The chamber portions 24, 26 extend through the barrel 22 in the longitudinal direction from an upstream side 28 to a downstream side 30. At the upstream side 28 of the barrel 22, a material supply port 32, which can comprise a hopper or other material supply structure, is provided for supplying the ceramic-forming mixture 29 to the extruder machine 20. An extrusion die 34 is provided at a discharge end 36 at the downstream side 30 of the barrel 22 for extruding the ceramic-forming mixture 29 into a desired shape, such as a honeycomb article or the like along direction 31. The extrusion die 34 can be coupled with respect to the discharge end 36 of the barrel 22, such as at a terminal end of the barrel 22. The extrusion die 34 can be preceded by other structures, such as a screen, screen support, and/or homogenizer (not shown), or the like to facilitate the formation of a steady plug-type flow front before the ceramic-forming mixture reaches the extrusion die 34.

As shown in FIG. 1, a pair of extruder screws 38, 40 are mounted in the barrel 22. First extruder screw 38 is rotatably mounted at least partially within one of the chamber portions 24, 26 while a second extruder screw 40 is rotatably mounted at least partially within the other of the chamber portions 24, 26. The first and second extruder screw 38, 40 can be arranged generally parallel to each other, as shown, though they can also be arranged at various angles relative to each other. Each of the first and second extruder screws 38, 40 can also be coupled to a driving mechanism 42 outside of the barrel 22 for rotation in the same or different directions. It is to be understood that both of the first and second extruder screws 38, 40 can be coupled to a single driving mechanism, or as shown, to individual driving mechanisms 42. The first and second extruder screws 38, 40 move the ceramic-forming mixture 29 through the chamber portions 24, 26 generally in direction 33 with a pumping and mixing action. Further support structures 35 (shown dotted) for supporting the first and second extruder screws 38, 40 may be provided.

Figure 2:
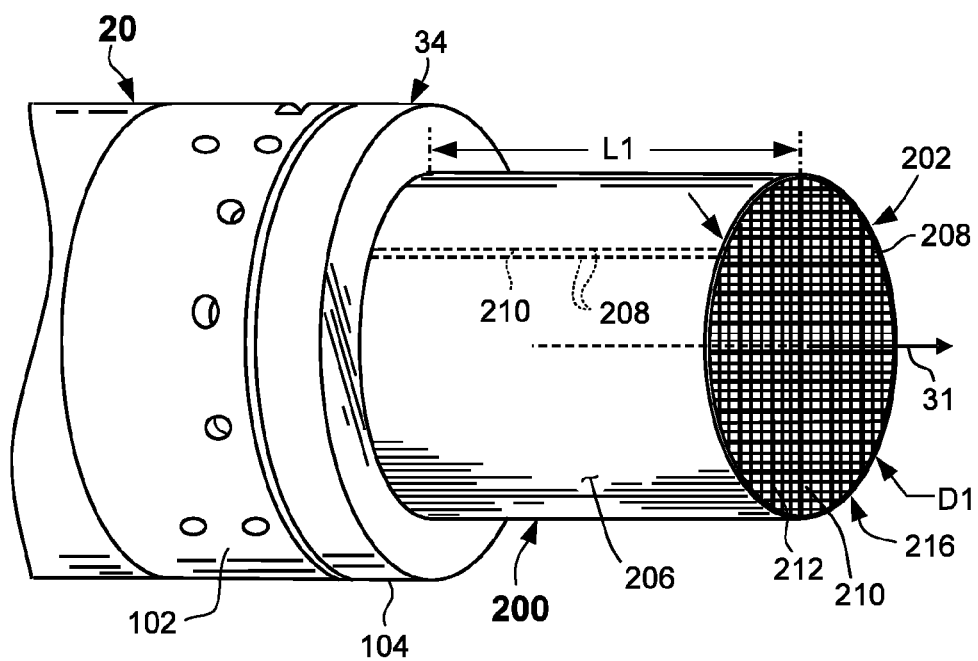
FIG. 2 illustrates a schematic perspective illustration of an extruder front end and a honeycomb extrudate according to embodiments of the disclosure.

FIG. 2 is a schematic illustration of an end of an extruder 20 and shown with a honeycomb extrudate 200 being extruded therefrom. The extruder 20 is shown with extruder front end where the ceramic-forming mixture 29 exits the extruder 20 as the honeycomb extrudate 200. An extruder cartridge 102 coupled at an end of the extruder 20 comprises extrusion hardware such as an extrusion die 34 comprising a skin forming mask 104. The honeycomb extrudate 200 can comprise a plurality of channels and an outer peripheral surface 206. The honeycomb extrudate 200 thus comprises a honeycomb body. As depicted in FIG. 2, honeycomb extrudate 200 has a length L1 and comprises a first end face 202 and the outer peripheral surface 206 (skin) extending from the extruder front end to the first end face 202. A plurality of intersecting walls 208, 212 (thin walls 208 and thick walls 212) forms mutually adjoining channels 210 that extend in the extrusion direction 31 (also referred to herein as the axial direction or z-direction) to form a honeycomb matrix of intersecting walls 208, 212. For example, intersecting thin walls 208 form a channel 210 extending in the extrusion direction as is shown by dashed lines for illustration. Intersecting thick walls 212 can have a greater thickness than intersecting thin walls 208 according to example embodiments as described further herein. A maximum cross-sectional dimension perpendicular to the axial direction 31 is indicated by dimension D1. For example, when the honeycomb extrudate 200 is a circular cylinder shape, the maximum dimension D1 may be a diameter of the first end face 202. For example, when the honeycomb extrudate 200 cross-section perpendicular to the axial direction 31 is a rectangular shape, the maximum dimension D1 may be a diagonal of an end face.

While horizontal extrusion is illustrated in FIG. 2, this disclosure is not so limited, and extrusion can be horizontal, vertical, or at some incline thereto.

Cell density of the honeycomb extrudate 200 comprising the honeycomb structure comprising thin walls 208 and thick walls 212 can be between about 100 and 1,500 cells per square inch (cpsi) (between about 15.5 and 232.5 cells per square cm). Each of the respective thin wall portions and thick wall portions may exhibit different cell densities. Cell wall thicknesses of the thin walls 208 and thick walls 212 can range from about 0.038 mm to about 1.5 mm (about 1.5 mil to 60 mil, where one mil is 0.001 inch). For example, the geometry of the honeycomb extrudate 200 may contain various combinations of cell density (cpsi) of the thin walls 208 and thick walls 212 therein. As used herein, honeycomb extrudate 200 can comprise a rectangular honeycomb cell structure, but is not strictly limited to a square cell structure in cross-section. For example, rectangular non-square, hexagonal, octagonal, triangular, rectangular, circular, elliptical, other curved shapes, or other suitable cell shapes or combination thereof, such as polygonal with rounded corners and/or arced walls, may be used. Also, while the external cross-sectional shape of the honeycomb extrudate 200 is illustrated as circular, it is also not so limited. For example, the external cross-sectional shape can be elliptical, race-track-shaped, square, rectangular, tri-lobed, asymmetrical, symmetrical, or other desired shapes, and combinations thereof.

Upon exiting the extruder 20 in axial direction, also referred to herein as extrusion direction 31, the wet honeycomb extrudate 200 stiffens and comprises a network of axially extending intersecting walls 208, 212 (webs) that form axially extending channels 210 and an axially extending outer peripheral surface 206. The intersecting walls 208, 212 and channels 210 form a honeycomb matrix 216. Disposed at the outer periphery of the honeycomb matrix 216 is the outer peripheral surface 206. The outer peripheral surface 206 may be a co-extruded skin (e.g., an integrally formed co-extruded skin). Optionally, the outer peripheral surface 206 may comprise partial channels and an after-applied skin may be later applied.

Wet honeycomb extrudate 200 can be cut or otherwise formed into lengths of green honeycomb bodies via known methods. As used herein, wet honeycomb extrudate 200 refers to extrudate prior to drying.

Figure 3:
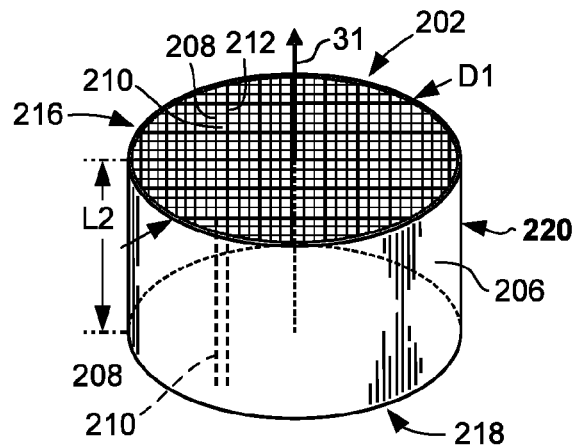
FIG. 3 illustrates a schematic honeycomb body comprising thick and thin walls according to embodiments of the disclosure.

With additional reference to FIG. 3, the ceramic-forming mixture, upon exiting the front end of the extruder 20, is formed into the wet honeycomb extrudate 200 that can be cut to length L2 forming a second end face 218 to form a wet green honeycomb body 220. That is, wet green honeycomb body 220 can be cut from the wet green honeycomb extrudate 200. The outer peripheral surface 206 of the wet green honeycomb body 220 can extend axially from the first end face 202 to the second end face 218. The wet green honeycomb body 220 can be severed from the honeycomb extrudate 200. Severing can be done by wire cutting, saw cutting, such as a band saw or reciprocating saw, laser cutting, or other cutting means. The honeycomb body 220 can have a honeycomb structure, a length L2, and comprise the first end face 202, the second end face 218, and an outer peripheral surface 206 extending between the first end face 202 and the second end face 218. The plurality of intersecting walls 208, 212 that form mutually adjoining channels 210 extending in the axial direction 31 between opposing first and second end faces 202, 218, according to exemplary embodiments of the disclosure, form the honeycomb matrix 216. Intersecting walls 208, 212 form channels 210 that extend between the first and second end faces 202, 218 are shown in dashed lines for illustration. Some intersecting walls 212 can have a greater thickness than other intersecting walls 208 according to example embodiments as described herein. A honeycomb body 220 comprising a greater number of intersecting walls 208 having thinner walls than intersecting walls 212 having thicker walls is referred to herein as a "nested structure." For example, a nested structure can have at least twice as many or three times as many, or more, intersecting walls 208 that are thinner than intersecting walls 212 that are thicker.

The axial direction is indicated by arrow 31 and a maximum cross-sectional dimension perpendicular to the axial direction is indicated by D1. The top face refers to the first end face 202 and the bottom face refers to the second end face 218 of the honeycomb body 220 positioned in FIG. 3, otherwise the first and second end faces 202, 218 are not limited by the orientation of the honeycomb body 220. The first end face 202 can be an inlet face and the second end face 218 can be an outlet face of the honeycomb body 220. The outer peripheral surface 206 (e.g., skin) of the honeycomb body 220 extends axially between the first end face 202 and the second end face 218. As used herein, the honeycomb body 220 can be a log that can undergo further processing prior to firing or the honeycomb body 220 can be a final-sized honeycomb structure substantially ready for firing.

Thermal mass of honeycomb body, such as when used as a substrate or filter for fluid cleaning, such as for cleaning an exhaust gas, can play a role in determining catalytic performance, for example, during cold start stages and low temperature engine cycles. Ever more stringent exhaust gas regulations highlight the long felt need for a honeycomb product with lower thermal mass and higher heat exchange surface area as well as larger open frontal area (OFA) with lower or equivalent back pressure than present conventional ceramic honeycomb products. For example, the demand for thin-wall honeycomb bodies, such as honeycomb bodies having web thicknesses of 0.004 inches (0.10 mm) or less, is increasing. At the same time, honeycomb bodies incorporating greater number of cells, for example, greater than about 400 cells/in$^2$ (about 62 cells/cm$^2$) are also in demand to provide additional surface area for catalyst application. Although current extrusion die designs can be adapted to the extrusion of thin-walled honeycomb bodies with no gross forming defects, certain new problems unique to these honeycomb bodies comprising such thinner walls may be encountered. One problem is that such thin-walled honeycomb bodies exhibit lower strength in the fired ceramic honeycomb bodies, which may lead to fractures and cracking during canning operations.

Attempts at development of wall thicknesses of less than about 2.5 mils (0.0635 mm) have met with some success; however, such ultrathin web (UTW) honeycomb bodies exhibit low isostatic (ISO) strength due to the thinner walls.

A honeycomb body 220 with periodically thickened walls (e.g., thick walls 212) offers a synergistic combination of, in some embodiments, meeting the thermal mass requirements for fast light-off and low frontal area while also improving or maintaining ISO strength compared to prior art thin-walled honeycomb bodies. The thickness of the thick walls 212 and their periodicity can be determined by the strength requirements while achieving a targeted product thermal mass by incorporating the thin walls 212. However, having combinations of thin and thick walls 208, 212 presents forming challenges. Solving the challenge of developing extrusion dies to provide uniform flow across the face of such honeycomb bodies 220 comprising thin and thick walls 208, 212 can enable defect-free manufacture of these honeycomb bodies 220.

According to example embodiments disclosed herein, extrusion apparatus; honeycomb extrusion dies, and methods of forming honeycomb bodies are provided. The aforementioned apparatus, extrusion dies, and methods may provide for knit of walls with significantly different wall thicknesses to each other across the honeycomb body.

Known extrusion die designs extrude, for example, honeycomb bodies that have a 2.8 mil (0.0711 mm) wall thickness with a tolerance of about a 0.0002 inch (0.005 mm) difference between thicknesses of various walls. In contrast, according to the example embodiments disclosed herein, walls with significantly different web thicknesses across the honeycomb body 220 can be provided using extrusion dies, extrusion apparatus, and extrusion methods described herein. In particular, extrusion dies, extrusion apparatus, and extrusion methods described herein may be used to extrude honeycomb bodies 220 having nested cell structures comprising combinations of thin walls 208 and thick walls 212 and that may comprise, for example, a 900/1.5/100/4.5 configuration comprising a 900/1.5 (139 cells per square cm (cpscm)/0.0381 mm) thin wall structure and a 100/4.5 (15.5 cpscm/0.114 mm) thick web structure. Another example of a honeycomb body 220 comprising a nested cell structure comprises a 750/1.5/83/4.5 configuration having a 750/1.5 (116 cpscm/0.0381 mm) thin wall structure and 83/4.5 (12.86 cpscm/0,114 mm) thick wall structure. Other suitable examples comprising combinations of thin walls 208 and thick walls 212 of honeycomb bodies 220 having nested cell structures are possible. The above examples are illustrative only and not intended to be limiting.

Figure 4:
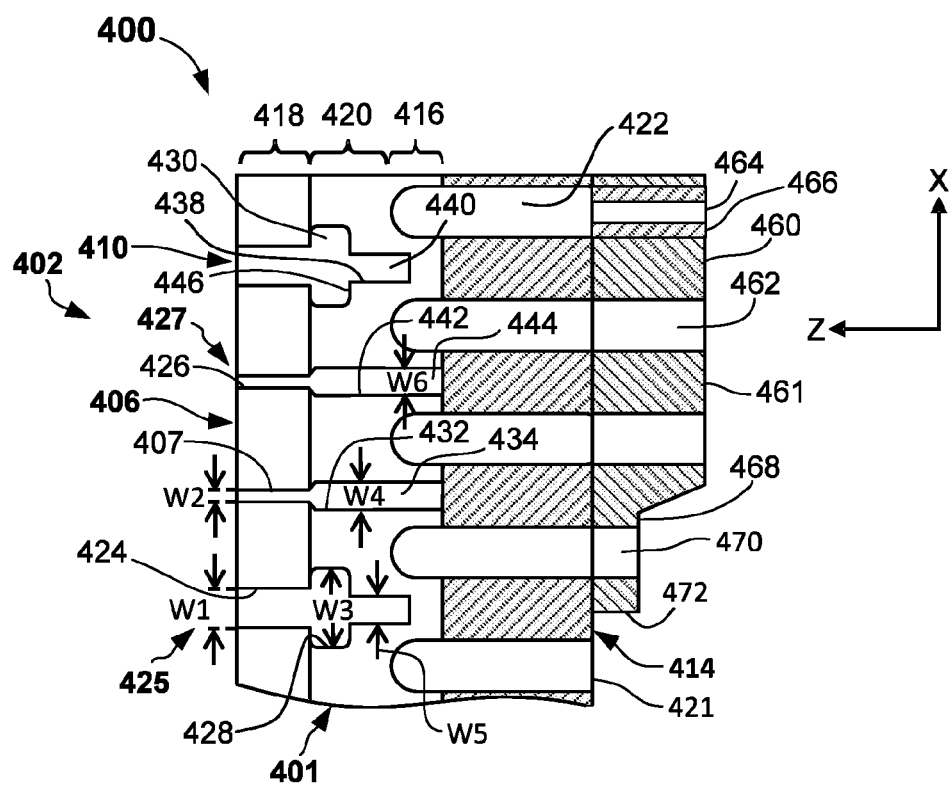
FIG. 4 illustrates a partial schematic cross-section of a honeycomb extrusion die body according to embodiments of the disclosure.

A schematic diagram of a portion of an example honeycomb extrusion die 400 for extrusion of honeycomb bodies 220 with combinations of thin walls 208 and thick walls 212 is shown in cross section in FIG. 4. The honeycomb extrusion die 400 is configured for extruding walls 208, 212 with significantly different web thicknesses across the honeycomb body 220. Honeycomb extrusion die 400 can have, for example, narrow discharge slots 427 of about 1.7 mils (0.043 mm) width and wide discharge slots 425 of about 5.1 mils (0.129 mm) width. Such an example honeycomb extrusion die 400 can achieve die extrusion pressures around 2,500 psi (17.24 MPa) at an extrusion speed of 1 inch/s (2.54 cm/s), for example. The honeycomb extrusion die 400 is not intended to be limited and can include configurations to extrude honeycomb bodies with two different wall thicknesses arranged in space with different repetition frequency. For example, nested cell structures with cells arranged into rows (R) and columns (C) (such as a R×C of 3×3, 3×4, 3×5, 3×6, 4×4, 4×5, 4×6, 5×5, 5×6, 6×6, and the like) may be manufactured using the extrusion dies 400 described herein. Other thin wall 208 and thick wall 212 configurations are possible.

Referring now to FIGS. 4, 5, 6, 7, and 8, a description of example embodiments of extrusion dies 400-700 configured to extrude honeycomb bodies comprising walls of different thicknesses across the honeycomb bodies, referred to as nested cell honeycomb bodies, and nested cell honeycomb extrusion dies, are herein provided.

FIG. 4 is a schematic cross-sectional side view of a honeycomb extrusion die 400 according to example embodiments. A discharge face 402 (exit face) of a die body 401 comprises an array of pins 406 spaced apart from one another in x- and y-directions (perpendicular to x and y) that define a honeycomb network of intersecting discharge slots 410. The discharge slots 410 have a slot length extending in a z-direction.

An inlet face 414 of the die body 401 is disposed opposite the discharge face 402 and spaced therefrom in the z-direction. Each of the pins 406 comprises an outer surface comprising an inlet portion 416, an outlet portion 418, and an intermediate portion 420 disposed between the inlet portion 416 and the outlet portion 418 of each of the pins 406. The outlet portions 418 of the outer surfaces on at least some of the pins 406 define the discharge slots 410. The inlet portions 416 of the outer surface on at least some of the pins 406 interface with one or more axial feedholes 422 that extend in the z-direction and that intersect with at least some of the discharge slots 410. First outlet portions 424 of the outer surfaces of a plurality of the pins 406 define a plurality of thick (wide) discharge slots 425 having a wide slot exit width W1 (first width). Second outlet portions 426 of the outer surfaces of the plurality of pins 406 define a plurality of thin (narrow) discharge slots 427 having a narrow slot exit width W2 (second width), wherein the first width W1 is wider than the second width W2. In some embodiments, the first width W1 is twice the second width or greater. In other embodiments, the first width W1 is three, four, or more, times the second width W2. In this context, for convenience of description, wide or thick refers to the first outlet portions 424 defining thick (wide) discharge slots 425 of width W1 and narrow or thin refers to the second outlet portions 426 defining thin (narrow) discharge slots 427 of width W2.

Figure 5:
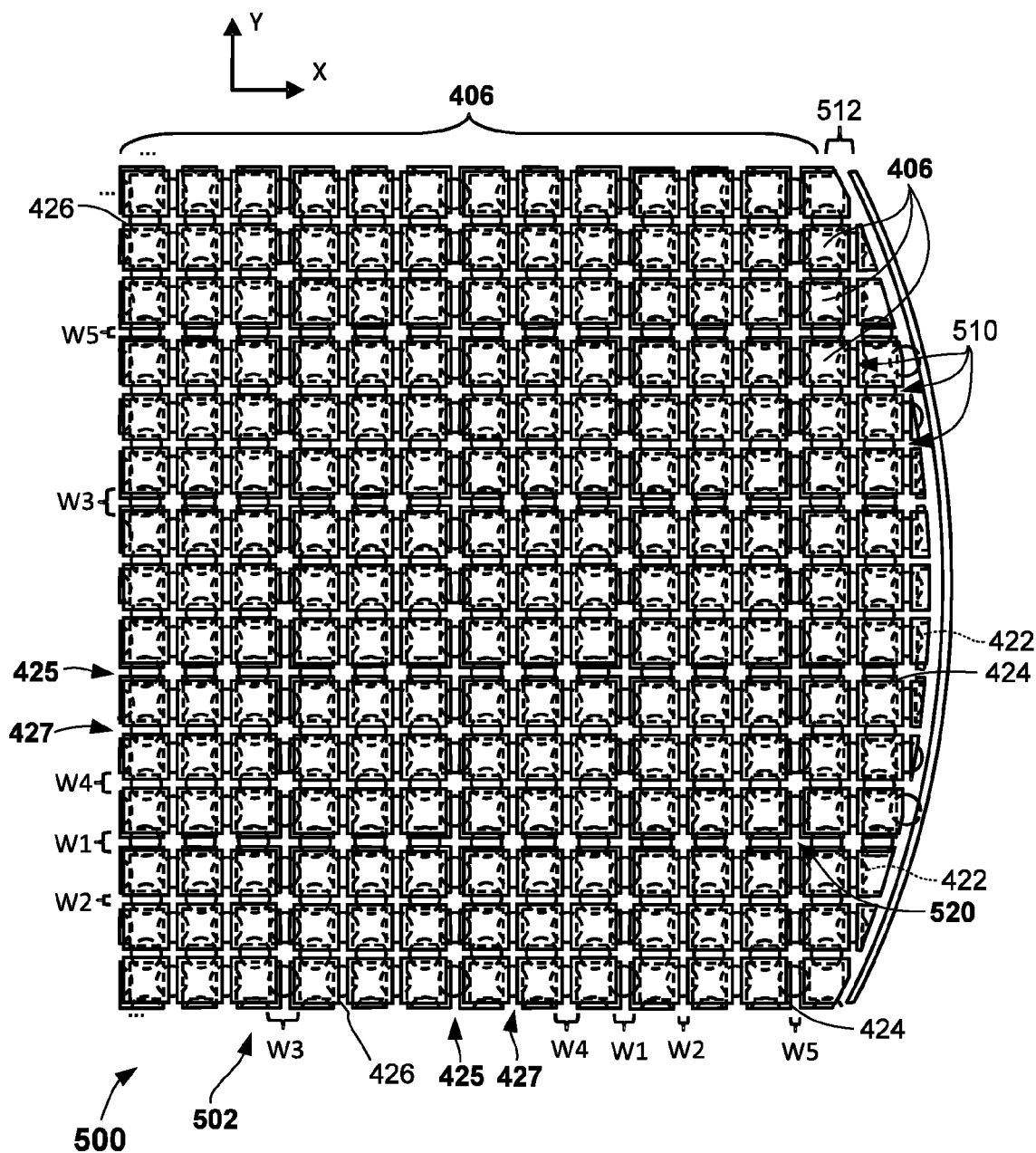
FIG. 5 illustrates a schematic plan view of a portion of an outlet end of a honeycomb extrusion die body according to embodiments of the disclosure.

First intermediate portions 428 of the outer surfaces of the plurality of pins 406, which comprise the first outlet portions 424, define first indentation surface features 430 (e.g., divots) such that a first intermediate distance W3 between opposing first intermediate portions 428 is greater than the first width W1. Second intermediate portions 432 of the outer surfaces of the plurality of pins 406, which comprise the second outlet portions 426, define at least part of second indentation surface features 434 (e.g., plenums) such that a width W4 between opposing second intermediate portions 432 is greater than the second width W2. The first indentation surface features 430 can extend deeper into each pin 406 than the second indentation surface features 434, FIG. 5 illustrates another example embodiment of an exit face 502 of a honeycomb extrusion die body 500. The exit face 502 comprises an array of pins 406 spaced apart from one another in x- and y-directions that define a honeycomb matrix of intersecting discharge slots 510 (slot exits). The slots extend in the z-direction (perpendicular to the page in FIG. 5). Axial feedholes 422 (shown dotted in FIG. 5) can be seen disposed at mid pin positions (between slot intersections) in the plan view of FIG. 5. A skin forming region 512 can be disposed at a periphery of the exit face 502, wherein said skin forming region 512 may be produced by an interface of the die body 500 with a skin-forming mask.

A first group of the first outlet portions 424 of the outer surfaces of the plurality of pins 406 having the first width W1 are disposed in the x-direction. The first group of the first outlet portions 424 can also be disposed periodically alternating in the x-direction with a first group of the second outlet portions 426 of the outer surfaces of the plurality of pins 406 having the second width W2. As illustrated in FIG. 5, for example, there is alternation between one wide discharge slot 425 of first width W1 and two narrow discharge slots 427 of second width W2 extending in the x-direction.

As can also be seen in FIG. 5, a second group of the first outlet portions 424 defining a second plurality of wide discharge slots 425 having the first width W1 extend in the y-direction. The second group of the first outlet portions 424 can be periodically alternating in the y-direction with a second group of the second outlet portions 426 defining a second plurality of narrow discharge slots 427 having the second width W2. As illustrated in FIG. 5, for example, there is one wide discharge slot 425 of first width W1 for two narrow discharge slots 427 of second width W2 extending in the y-direction. The configuration of wide discharge slots 425 can form enclosures 520 that surround or enclose one or more narrow discharge slots 427. The configuration of wide discharge slots 425 of FIG. 5 forms rectangular (e.g., square) enclosures 520 that enclose two parallel narrow discharge slots 427 extending in the x-direction and two parallel narrow discharge slots 427 extending in the y-direction.

Furthermore, the pins 406 within the extrusion die body 500 may be arranged in a repeating pattern of a plurality of enclosed extrusion pin blocks. Each pin block defines a plurality of narrow discharge slots 427 and at least partially defines a plurality of wide discharge slots 425. In some embodiments, each pin block comprises a plurality of pins 406 that define a subset of the narrow discharge slots 427 and that do not define any of the wide discharge slots 425. Each pin block further comprises a plurality of pins that define both a second subset of the narrow discharge slots 427 and a subset of the wide discharge slots 425. In various embodiments, at least two directly adjacent closed pin blocks share at least one wide discharge slot 425. Each closed extrusion pin block has a periphery that is defined by wide discharge slots 425. In some embodiments, each closed extrusion pin block comprises a plurality of pins 406 arranged into rows (R) and columns (C). In one specific example, each closed extrusion pin block has three rows and three columns of pins, as shown in, for example, FIG. 5. However, other configurations, such an R×C (i.e., "R by C" or "R rows by C columns") of 3×3, 3×4, 3×5, 3×6, 4×4, 4×5, 4×6, 5×5, 5×6, and 6×6 may also be used.

In the illustrated embodiment of FIG. 5, the x-direction is substantially perpendicular to y-direction, but the disclosure is not so limited and the y-direction can be disposed at other angles relative to the x-direction, such as nearly 60 degrees for honeycomb die bodies having outer surfaces of die pins in the outlet portion having hexagonal shapes.

The intersecting array 510 can have wide discharge slots 425 of the first width W1 and narrow discharge slots 427 of the second width W2. The intersecting array 510 can have some wide discharge slots 425 of the first width W1 extending in the x-direction, referred to herein as the first group, and some wide discharge slots 425 of the first width W1 extending in the y-direction, referred to herein as a second group. The intersecting array 510 can have some narrow discharge slots 427 of the second width W2 extending in the x-direction in a first group and some narrow discharge slots 427 of the second width W2 extending in the y-direction in the second group. For example, the intersecting array 510 can have some wide discharge slots 425 extending in the x-direction, some wide discharge slots 425 extending in the y-direction, some narrow discharge slots 427 extending in the x-direction, and some narrow discharge slots 427 extending in the y-direction. In some of these example embodiments, the intersecting array 510 can have one or more wide discharge slots 425 of the first width W1 extending in a first direction, and one or more narrow discharge slots 427 of the second width W2 extending parallel to the first direction. In some of these example embodiments, the first direction can be the x-direction or the y-direction.

In some of these example embodiments, one or more narrow discharge slots 427 can be disposed between two of the wide discharge slots 425. For example, two or more narrow discharge slots 427 can be interposed between two adjacent ones of the wide discharge slots 425. The intersecting array 510 can have wide discharge slots 425 of the first width W1 extending in a first direction (e.g., the x-direction), and wide discharge slots 425 of the first width W1 extending in a second direction (e.g. the y-direction) orthogonal to the first direction.

While the illustrated embodiments in FIGS. 4, 5, 6, 7, and 8 show the ratio of the number of a first group of narrow discharge slots 427 having the second width W2 extending in the x-direction to the number of a first group of wide discharge slots 425 having the first width W1 extending in the x-direction is two, the ratio can be greater than two. Likewise, while a ratio of two is shown in the illustrated embodiments, the ratio of the number of second group of narrow discharge slots 427 having the second width W2 extending in the y-direction to the number of a second group of wide discharge slots 425 having the first width W1 extending in the y-direction can be two or greater.

The first outlet portions 424 of the first group intersect first outlet portions 424 of the second group and the first outlet portions 424 of the first group intersect second outlet portions 426 of the second group. The second outlet portions 426 of the first group intersect first outlet portions 424 of the second group and the second outlet portions 426 of the first group intersect second outlet portions 426 of the second group.

Referring to FIGS. 4, 5, 6, 7, and 8, first inlet portions 438 of the side surfaces 407 of the plurality of pins 406, which include the first outlet portions 424, are spaced apart to define a first plurality of divot feed slots 440 having a first inlet width W5. Second inlet portions 442 of the outer surfaces of the pins 406 are spaced apart to define a second plurality of inlets 444 having a second inlet width W6. The first inlet width W5 can be substantially equal to the second inlet width W6. The second inlet width W6 can be substantially equal to the width W4. Further, the first indentation surface features 430 (e.g., divots) extend laterally deeper into each pin 406 than the first inlet portions 438. The first outlet portions 424 can extend laterally deeper into each pin 406 than the first inlet portions 438. A divot floor portion 446 is shown between the first intermediate portion 428 and the first inlet portion 438.

In some embodiments, the feedholes 422 can intersect with inlet portions 416 at a position that is mid pin as shown in FIG. 4. In some embodiments described herein, the feedholes 422 can extend deeper into each pin 406 than the second indentation surface features 434 (e.g., plenums). In some embodiments, the feedholes 422 can extend deeper into each pin 406 than the divots 430. In some embodiments, the feedholes 422 can extend deeper into each pin 406 than the first indentation surface features 430 (e.g., divots) and the second indentation surface features 434 (e.g., plenums). In some of these embodiments, the feedholes 422 do not intersect with the first indentation surface features 430 (e.g., divots). In some embodiments, the feedholes 422 can intersect with the second indentation surface features 434 (e.g., plenums).

The feedholes 422 can intersect with inlet portions 416 of the outer surfaces of the plurality of pins 406. In some embodiments, the inlet portions 416 of the outer surface on at least some of the pins 406 intersect with one or more of the feedholes 422 on x-z inlet portions of the outer surface of the pins 406 (e.g., for discharge slots that extend along the x direction). In some embodiments, the inlet portions 416 of the outer surface on at least some of the pins 406 intersect with one or more of the feedholes 422 on y-z inlet portions of the outer surface of the pins 406 (e.g., for discharge slots that extend along the y-direction). In some further embodiments, the inlet portions 416 of the outer surface on at least some of the pins 406 intersect with one or more of the feedholes 422 on an x-z inlet portion and a y-z inlet portion of the outer surface of the pins 406. In some embodiments, the inlet portions 416 of the outer surfaces on all of the pins 406 have feedholes 422 on x-z inlet portions and y-z inlet portions of the outer surfaces of the pins 406.

Figure 6:
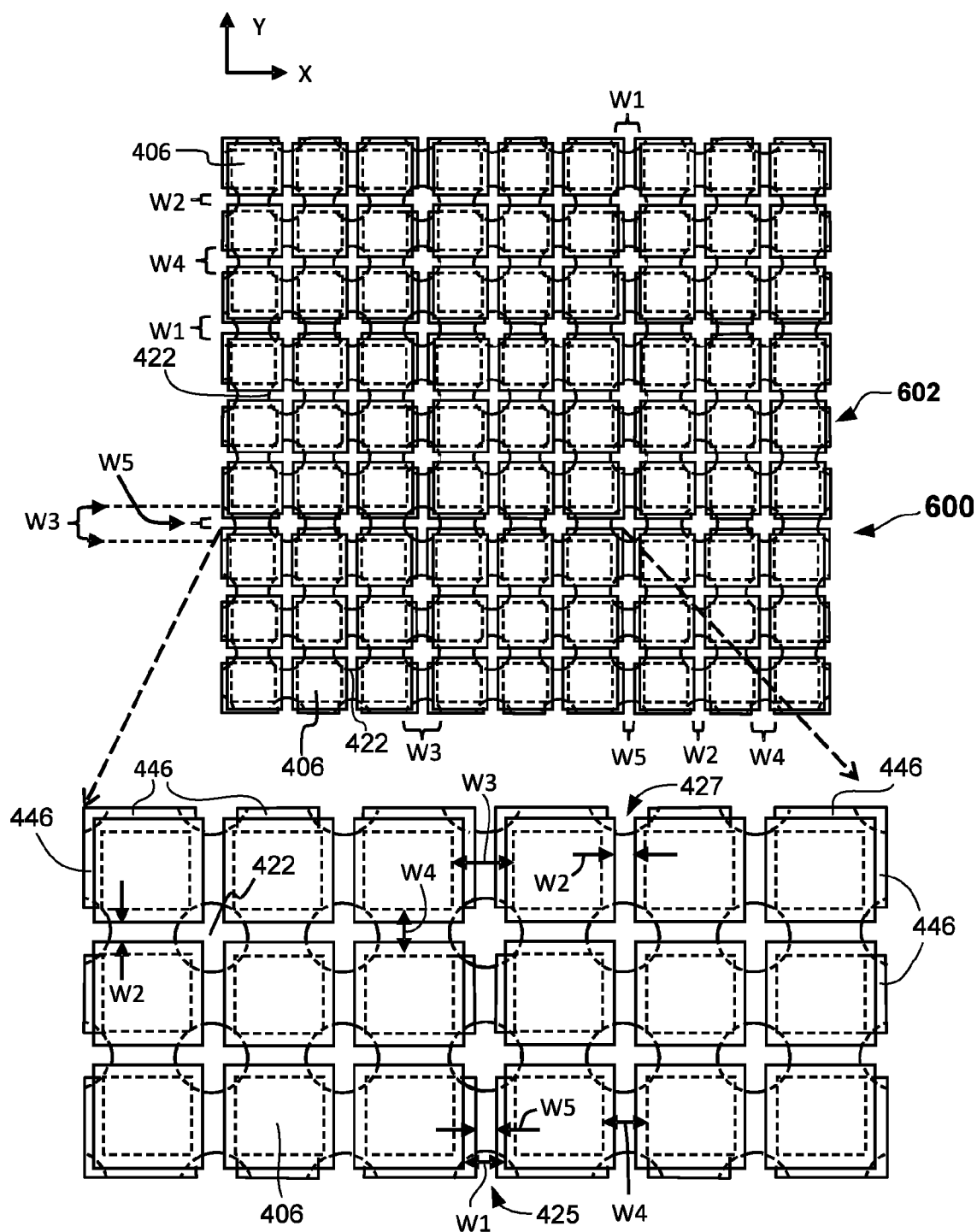
FIG. 6 illustrates a schematic plan view of a portion of an outlet end of a honeycomb extrusion die body according to embodiments showing details and feedholes at the corners of the pins.

FIG. 6 illustrates another example embodiment of an outlet end 602 of a honeycomb extrusion die body 600. The honeycomb extrusion die body 600 is the same as that shown in FIG. 5 except for the position of the feedholes 422. The outlet end 602 comprises an array of pins 406 spaced apart from one another in x- and y-directions that define a honeycomb network of intersecting discharge slots extending in a z-direction perpendicular to the page in FIG. 6. Feedholes 422 can be seen disposed at corner positions of the die pins 406 in the plan view of FIG. 6, i.e. at the intersections of the respective slots. As a further example, a die body can have feedholes 422 disposed at mid pin positions as shown in FIG. 5 and also at corner positions as shown in FIG. 6.

An enlargement of a portion of the honeycomb extrusion die body 600 shows details of the outlet end 602 at the bottom of FIG. 6. The first width W1 of the wide discharge slots 425 is shown in solid lines between outer surfaces of adjacent pins 406, the divot width W3 is shown in dashed lines between outer surfaces of adjacent pins 406, and the divot feed slot width W5 is shown in solid lines. The second width W2 of the narrow discharge slots 427 is shown in solid lines between outer surfaces of adjacent pins 406 and the plenum width W4 is shown in dashed lines between outer surfaces of adjacent pins 406.

Figure 7:
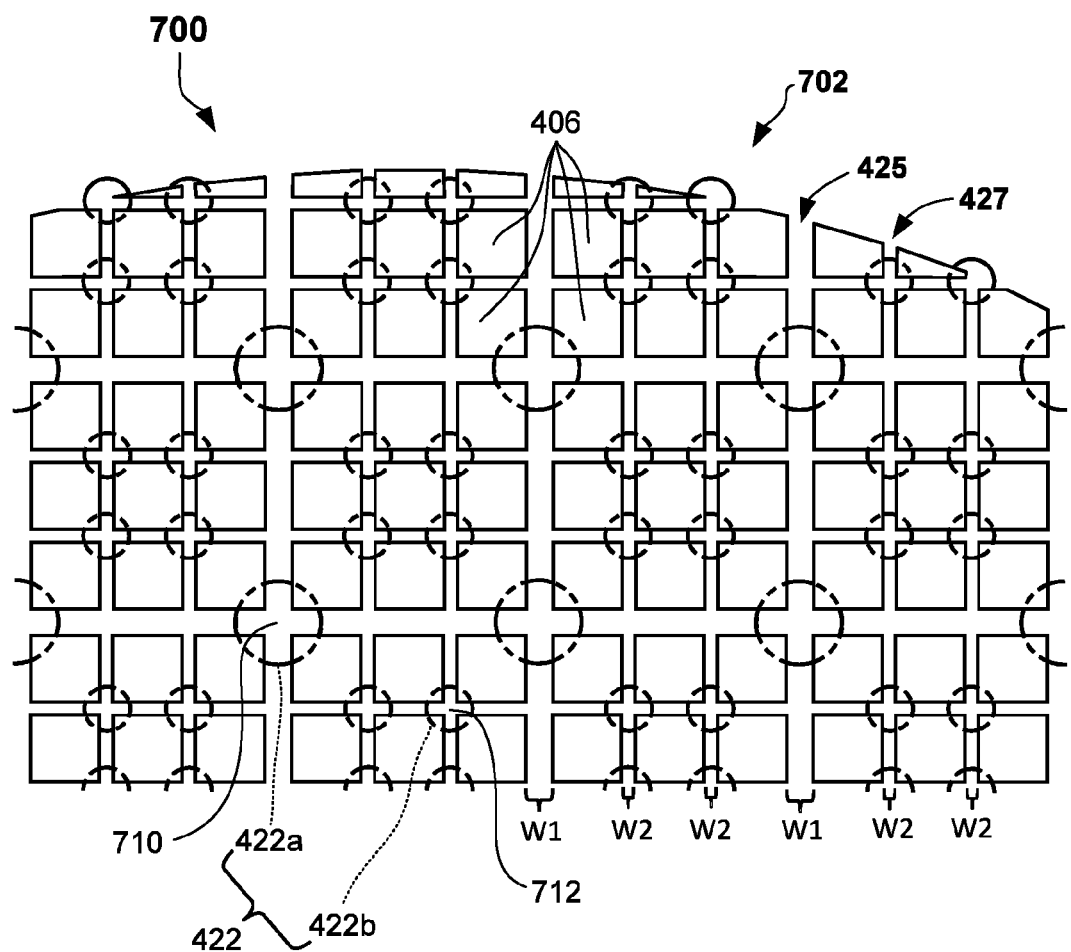
FIG. 7 illustrates a schematic plan view of an outlet portion of a honeycomb die body according to embodiments showing a feedhole arrangement at not every corner of the pins, but where wide slots intersect with wide slots, and where narrow slots intersect with narrow slots.

FIG. 7 is a schematic diagram of a portion of an outlet face of a honeycomb die body 700. A honeycomb network 702 can have wide discharge slots 425 of the first width W1 that intersect at large orthogonal intersections 710, and narrow discharge slots 427 of the second width W2 that intersect at narrow orthogonal intersections 712. The inlet portions of the pins 406 immediately adjacent the large orthogonal intersections 710 can comprise first feedholes 422a of a first hydraulic diameter. The inlet portions of the pins 406 immediately adjacent the narrow orthogonal intersections 712 can comprise second feedholes 422b of a second hydraulic diameter, wherein the first hydraulic diameter can be larger than the second hydraulic diameter. Feedholes 422 are located at the intersections of the narrow discharge slots 427 and at the intersections of the wide discharge slots 425. In the depicted embodiment, the intersections of the wide discharge slots 425 with the narrow discharge slots 427 are shown devoid of feedholes.

Figure 8:
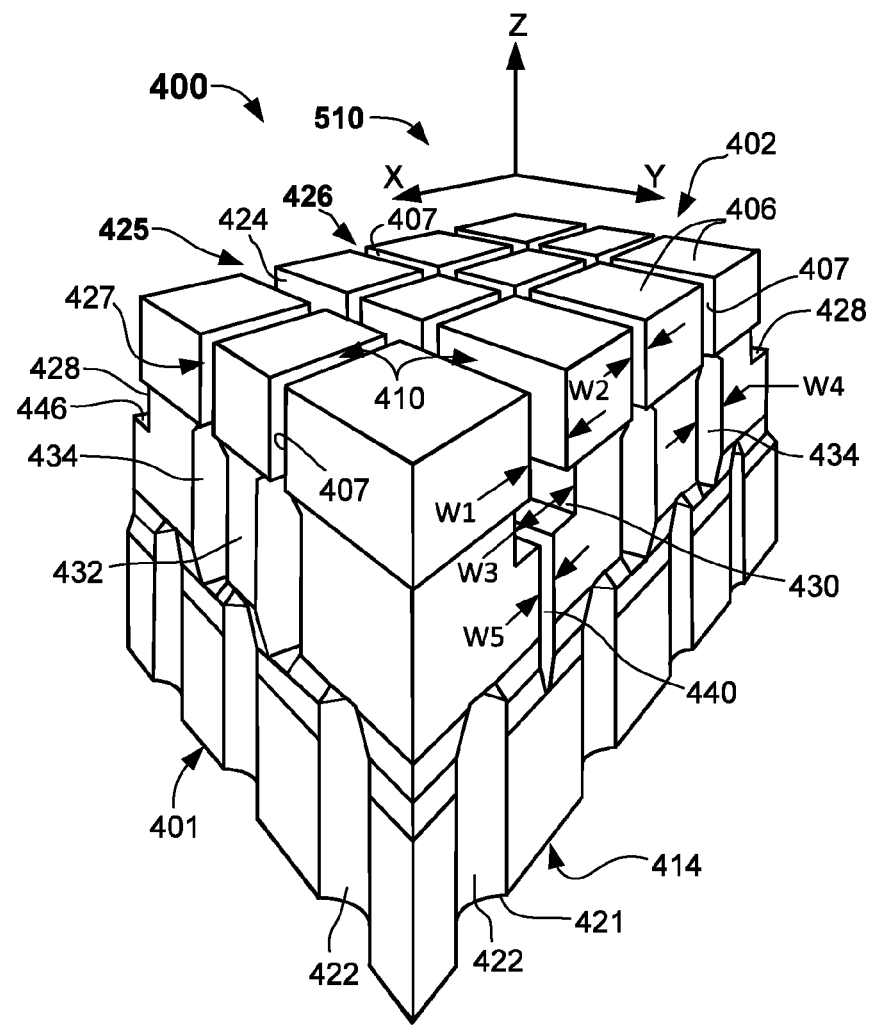
FIG. 8 illustrates a schematic perspective view of a portion of a honeycomb extrusion die according to embodiments of the disclosure.

FIG. 8 is a schematic isometric diagram of a portion of the honeycomb extrusion die 400 according to some example embodiments disclosed herein. The honeycomb extrusion die 400 shown in the illustrated embodiment comprises a die body 401, an inlet face 414, and a discharge face 402 (exit face) opposite the inlet face 414 in the z-direction. Inlet openings 421 in the inlet face 414 extend into the die body 401 to form feedholes 422. Die pins 406 disposed on the discharge face 402 comprise outer or side surfaces 407 extending into the die body 401. The side surfaces 407 define an intersecting array 510 of discharge slots 410 between adjacent side surfaces 407 of adjacent pins 406. The intersecting array 510 of discharge slots 410 according to the illustrated embodiment comprises wide discharge slots 425 of width W1 extending from the discharge face 402 into the die body 401 to first indentation surface features 430 (e.g., divots) of width W3. The width W3 is greater than first width W1. The first indentation surface features 430 (e.g., divots) extend into the die body 401 from the wide discharge slots 425 to divot feed slots 440 of width W5, which can be of less width than width W1. The divot feed slots 440 extend into the die body 401 from the divots 430 and are in fluid communication with the feedholes 422 in use. The intersecting array 510 of discharge slots 410 according to the illustrated embodiment further comprises narrow discharge slots 427 of width W2 extending into the die body 401 from the discharge face 402 to plenums 434 or second surface indentation features. The plenums 434 have a width W4, which is greater than width W2. The second indentation surface features 434 (e.g., plenums) of width W4 extend into the die body 401 from the narrow discharge slots 427 and are in fluid communication with the feedholes 422 in use.

In these embodiments, the positions of the wide discharge slots 425 alternate with the position of the narrow discharge slots 427 across the discharge face 402 in a first direction, such as an x-direction. The positions of the wide discharge slots 425 can also alternate with the position of the narrow discharge slots 427 across the discharge face 402 in a second direction, such as a y-direction. The intersecting array of discharge slots 410 can further comprise at least two narrow discharge slots 427 to every one wide discharge slot 425 (i.e., a ratio of 2 narrow discharge slots 427 for each one of the wide discharge slots 425). Tradeoffs between isostatic strength and fast light-off characteristics of a honeycomb body having alternating thick and thin walls can determine the number of narrow discharge slots 427 to every one wide discharge slot 425. For example, the intersecting array of discharge slots 410 can comprise at least two narrow discharge slots 427 to every one wide discharge slot 425, at least three narrow discharge slots 427 to every one wide discharge slot 425, at least four narrow discharge slots 427 to every one wide discharge slot 425, or even at least five narrow discharge slots 427 to every one wide discharge slot 425.

The intersecting array 510 of discharge slots 410 is shown as disposed in a rectilinear pattern with the discharge slots 410 extending in the x-direction and the y-direction. The arrangement of the intersecting array 510 of discharge slots 410 comprising wide discharge slots 425 and narrow discharge slots 427 is not so limited, and may comprise discharge slots 410 arranged in other honeycomb patterns of intersecting slots. For example, the intersecting array 510 of discharge slots 410 can be rectilinear, hexagonal, triangular radial, asymmetric, other polygonal, other curvilinear, or combinations thereof.

In these embodiments, each die pin side surface 407 meets another die pin side surface 407 of the same die pin 406 at a corner region and mid pin regions can be disposed between the corner regions. In some of these embodiments, the feedholes 422 can be disposed overlapping in the z-direction with the mid pin regions. In other words, the feedholes 422 and the discharge slots 410 are in fluid communication and the feedholes are configured to supply ceramic-forming mixture to the discharge slots. In some of these embodiments, the feedholes 422 can be disposed overlapping in the z-direction with the corner regions, i.e., located at some slot intersections. In some of these embodiments, the feedholes 422 can be disposed overlapping in the z-direction with the mid pin regions and also with the corner regions.

Figure 9:
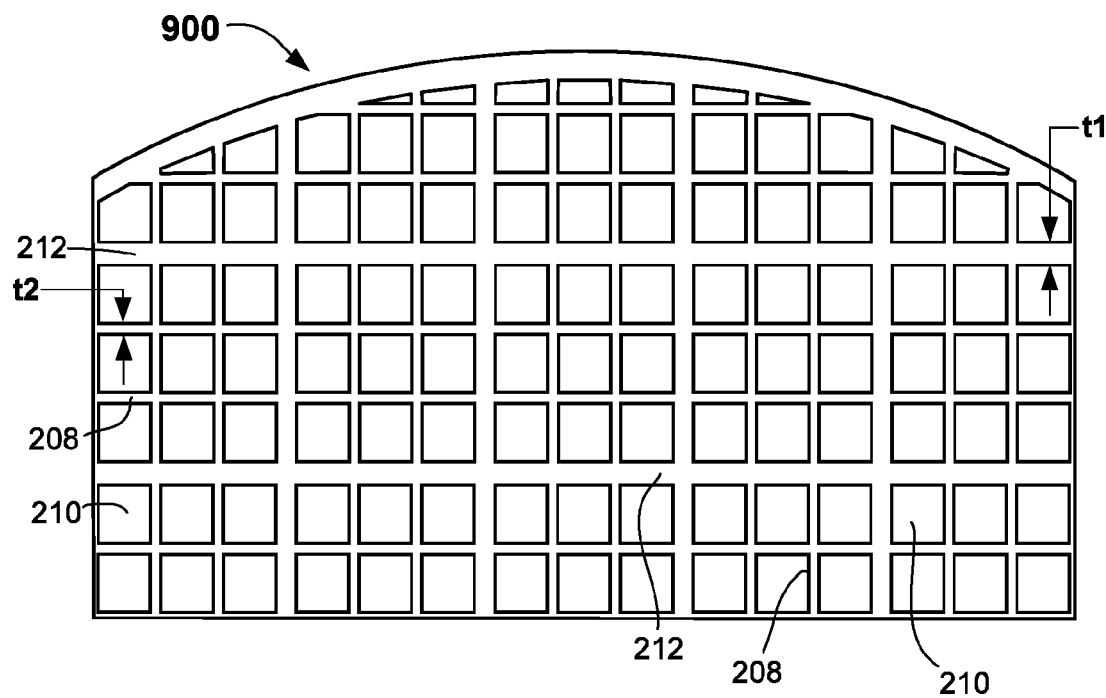
FIG. 9 illustrates a further embodiment of a honeycomb body having the nested channel arrangements comprising thick and thin walls according to embodiments of the disclosure.
Figure 10:
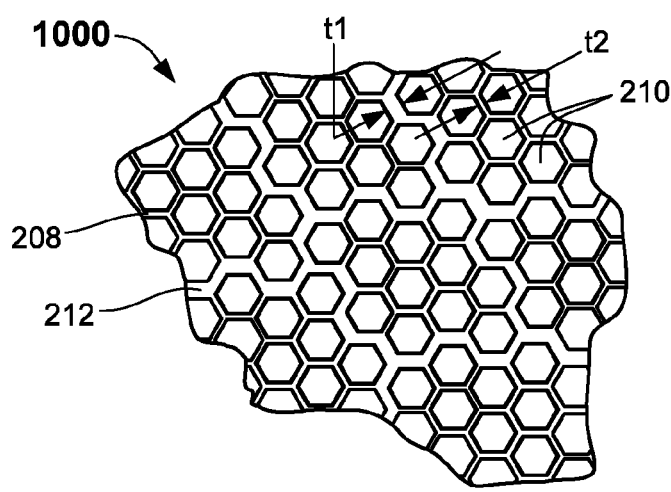
FIG. 10 illustrates a further embodiment of a portion of a honeycomb body having the nested channel arrangements according to embodiments of the disclosure.

FIGS. 9 and 10 illustrate further example embodiments of portions of extruded honeycomb structures 900, 1000 having nested channel arrangements. The full structures 900, 1000 can continue with the nested cell structures as shown to the periphery of the honeycomb bodies 900, 1000. FIG. 9 shows an extruded honeycomb structure 900 comprising first intersecting walls (thick walls 212) having a first thickness t1 and second intersecting walls (thin walls 208) having a second thickness t2, which is less than the first thickness t1. The first intersecting walls 212 and second intersecting walls 208 form channels 210 (a few labeled). The intersecting walls 212 can provide substantial isostatic strength to the extruded honeycomb structure 900 and form repeating nested structures within the honeycomb structure 900. The second intersecting walls 208 can provide substantial reduction in thermal mass and higher heat exchange surface area for fast light-off properties as well as larger open frontal area (OFA) for lower back pressure than a honeycomb structure that comprises substantially all thin walls.

FIG. 10 shows an example embodiment of a honeycomb structure 1000 comprising channels 210 having a hexagonal-shape in transverse cross section. The first intersecting walls (thick walls 212) of first width t1 and second intersecting walls (thin walls 208) of second width t2 form the channels 210. The die bodies disclosed herein can be implemented in other die geometries to yield other honeycomb body configurations comprising nested cell structures disclosed therein, wherein segments of thin walls 208 are bounded by thick walls 212. The nested cell structures comprising thick walls 212 and thin walls 208 can substantially increase ISO strength as compared to a honeycomb structure that comprises substantially all thin walls.

Figure 11:
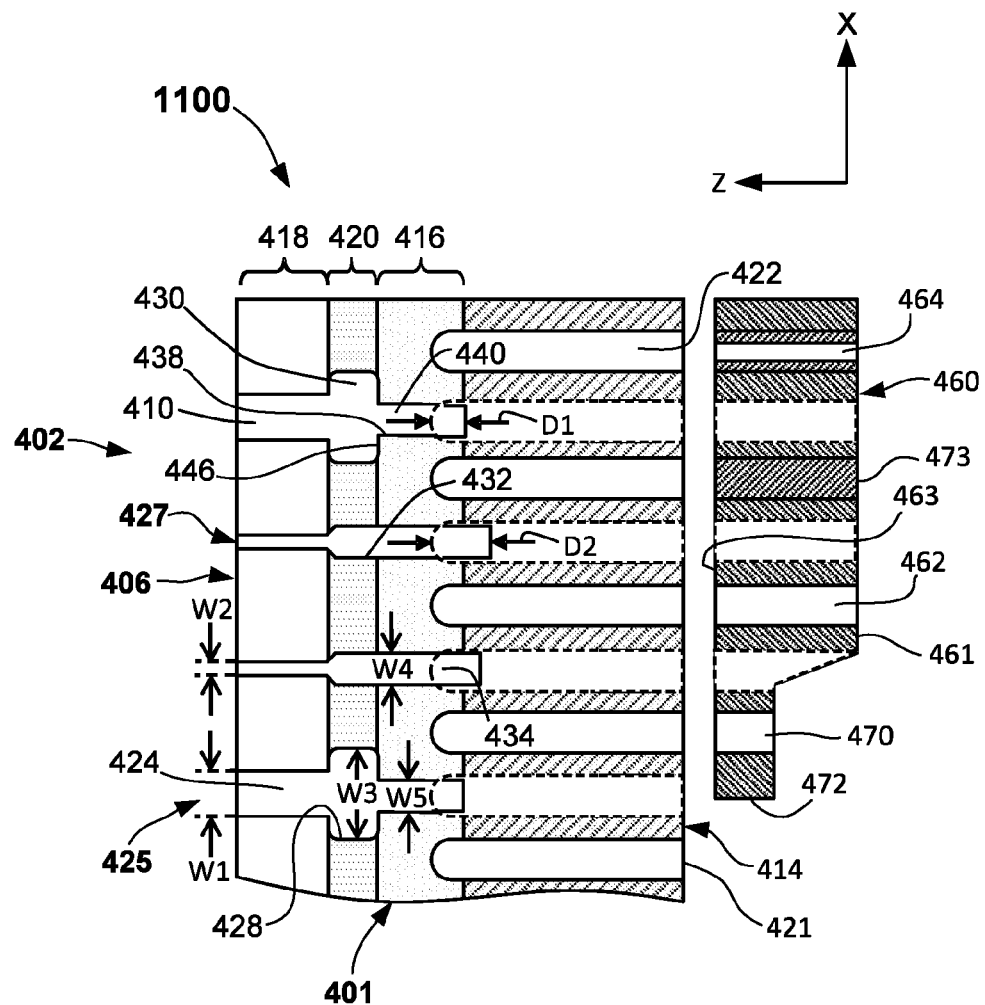
FIG. 11 illustrates a partial schematic cross-section of a honeycomb extrusion die body according to embodiments showing a first intermediate portion and first inlet portions of the outer surfaces of the pins.

Referring now to FIGS. 4 and 11, in some of these example embodiments, the honeycomb extrusion die 400 comprises an impedance plate 460 disposed directly adjacent, or in proximity, to the inlet face 414 of the die body 401 and upstream of the die body, as shown in the cross-sectional schematic diagrams of FIGS. 4 and 11. The impedance plate 460 in the illustrated embodiments can comprise an entrance face 461, an exit face 463, and entrance openings in the entrance face 461 extending through the impedance plate 460 to the exit face 463 to form impedance holes 462. At least some of the impedance holes 462 correspond to the inlet openings 421 for the feedholes 422 in the inlet face 414 of the die body 401. At least one impedance hole 464 can have a different radius and/or different length than another impedance hole 470 to balance impedance of ceramic-forming mixture flowing into and through the die body 401. In other words, holes may have different radii and/or lengths at different locations within the impedance plate 460. For example, a first set of holes 462 may have a first radius, while a second set of holes 462 may have second radius that is different (e.g., smaller or larger) from the second radius. In another example, a first set of holes 462 may have a first length, while a second set of holes 462 may have second length that is different (e.g., smaller or larger) from the second length. In some embodiments, some of the impedance holes 462 correspond to feedholes 422 in the die 400 and are configured to permit and/or direct flow of ceramic-forming mixture into the feedholes 422, while other portions of the impedance plate 460 partially or completely block ceramic-forming mixture from flowing into the feedholes. For example, the impedance plate 460 can comprise one or more impedance blocks 473 that block at least one of the inlet openings 421 at the inlet face 414 of the die body 401. The impedance plate 460 may end at an edge 472 and may be disposed on a portion of the inlet face 414. The radius of the impedance holes 462 will depend on the thickness of the wide and narrow slots, the wide-to-narrow slot ratio, the feedhole radius, and feedhole locations. In some embodiments, the radius of the impedance holes is between 3 mils (0.08 mm) and 11 mils (0.28 mm). For example, in one embodiment, for a die with a 1.7 mil (0.04 mm) narrow slot width, 5.1 mil (0.13 mm) wide slot width, a wide-to-narrow slot ratio of 3, a feedhole radius of 12 mil (0.3 mm), and a feedhole location that is mid-pin, impedance plates may comprise small impedance holes with a 6 mil (0.15 mm) radius and large impedance holes with varying diameters between a value greater than 6 mil (0.15) and a value of 9 mil (0.23).

Reference is now made specifically to FIG. 11, which illustrates a schematic cross-sectional view of a honeycomb extrusion die body 1100 according to example embodiments showing first intermediate portions 428 and first inlet portions 438 of the outer surfaces of the pins 406 intersecting narrow discharge slots 427 and wide discharge slots 425. FIG. 11 differs from FIG. 4, which shows second intermediate portions 432 intersecting narrow discharge slots 427 and wide discharge slots 425. In some embodiments, the divot feed slots 440 intersect a first portion of feedholes 422 and can extend into the first portion of feedholes by a depth D1. The second indentation surface features 434 (e.g., plenums) can intersect and extend into a second portion of feedholes by a depth D2, wherein depth D2 may be greater than depth D1.

Figure 12:
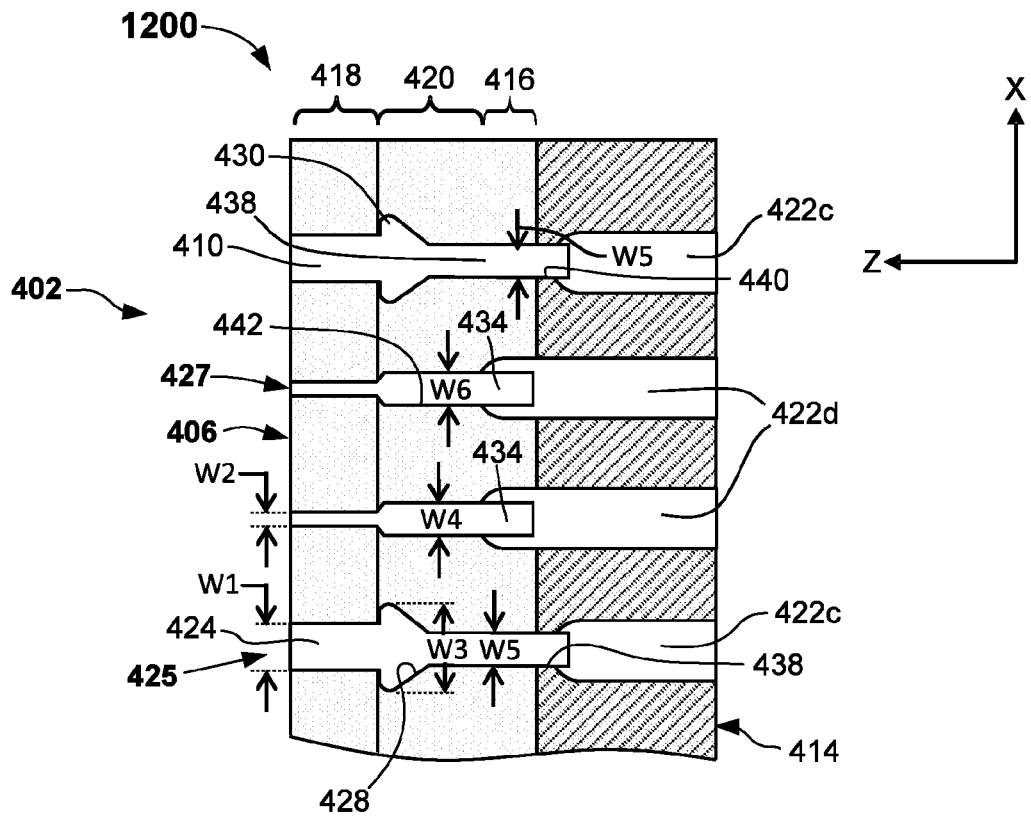
FIG. 12 illustrates a partial schematic cross-section of a honeycomb extrusion die body according to embodiments showing shallow feedholes intersecting first inlet portions of the outer surfaces of the pins and deeper feedholes intersecting plenum.

FIG. 12 is a schematic cross-sectional view of a honeycomb die body 1200 according to example embodiments showing shallow feedholes 422c intersecting the first inlet portions 438 of the outer surfaces of the pins 406. Deeper feedholes 422d can intersect the second indentation surface features 434 (e.g., plenums). In some of these embodiments, the divot feed slots 440 intersect a first portion of feedholes 422c and the second indentation surface features 434 (e.g., plenums) intersect a second portion of feedholes 422d, wherein the second portion of feedholes 422d extend from the inlet face 414 into the honeycomb die body 1200 in the z-direction a greater distance than the first portion of feedholes 422c. FIG. 12 also shows an example of first indentation surface features 430 (e.g., divots) having tapered first intermediate portions 428. The first indentation surface features 430 (e.g., divots may maintain their widest width W3 even with the tapered first intermediate portions 428).

Referring back to FIGS. 1 and 2, according to example embodiments disclosed herein, and in summary, an extruder machine 20 can comprise an extrusion die 34 attached to a discharge end 36 of the extruder machine 20. The honeycomb extrusion die 400 (FIGS. 4 and 8) can comprises a die body 401, an inlet face 414, and a discharge face 402 (outlet face) opposite the inlet face 414 in a z-direction. Inlet openings 421 in the inlet face 414 can extend into the die body 401 to form feedholes 422. Die pins 406 disposed on the discharge face 402 comprise outer or side surfaces 407 extending into the die body 401. Side surfaces 407 of the pins 406 define an intersecting array of discharge slots 410 between adjacent side surfaces 407 of adjacent pins 406. The intersecting array of discharge slots 410 according to the illustrated embodiment can comprise wide discharge slots 425 of first width W1 extending from the discharge face 402 into the die body 401 to first indentation surface features 430 (e.g.; divots). The first indentation surface features 430 (e.g., divots) have a width W3, which is greater than the first width W1. The first indentation surface features 430 (e.g., divots) extend into the die body 401 from the wide discharge slots 425 to divot feed slots 440. The divot feed slots 440 have width W5, which can be less than the first width W1 The divot feed slots 440 extend into the die body 401 from the first indentation surface features 430 (e.g., divots) and are in fluid communication with the feedholes 422 in use. The intersecting array of discharge slots 410 according to the illustrated embodiment comprises narrow discharge slots 427 of second width W2, which is less than first width W1, extending into the die body 401 from the discharge face 402 to second indentation surface features 434 (e.g., plenums). The second indentation surface features 434 (e.g., plenums) have a width W4, which can be greater than the second width W2. The plenums 434 extend into the die body 401 from the narrow discharge slots 427 and are in fluid communication with the feedholes 422.

Another example embodiment discloses a method of forming a honeycomb structure comprising alternating intersecting thin walls 208 and thick walls 212, which may alternate in a defined pattern. The method comprises directing a ceramic-forming mixture through a honeycomb extrusion die (e.g., any of the honeycomb extrusion die bodies 400, 500, 600, 700, 1100, and 1200 described herein). The honeycomb extrusion die comprises a die body; an inlet face, a discharge or exit face opposite the inlet face in an extrusion direction, inlet openings in the inlet face extending into the die body to form feedholes, and die pins disposed on the discharge face comprising side surfaces extending into the die body. Side surfaces of the die pins define an intersecting array of discharge slots between adjacent side surfaces of adjacent pins. The intersecting array of discharge slots comprise wide discharge slots of a first width W1 which are connected with the feedholes. The narrow discharge slots have second width W2, which is less than the first width W1. Both the narrow discharge slots and the wide discharge slots are connected to the feedholes. The ceramic-forming mixture exits the intersecting array of discharge slots at the discharge face as a honeycomb extrudate.

In some example embodiments, the method can comprise selectively restricting the ceramic-forming mixture to a portion of the inlet openings, for example, by utilizing the impedance plate 460 described above and shown in FIGS. 4 and 11.

In some embodiments, the method of forming honeycomb bodies can comprise cutting, drying, and firing the honeycomb extrudate that has been extruded through the honeycomb extrusion die to form a porous ceramic honeycomb body (e.g., 220, 900, 1000). The porous honeycomb body comprises a first end face, a second end face and nested intersecting cell walls extending from the first end face to the second end face forming channels therebetween. According to example embodiments, the intersecting cell walls comprise first cell walls of first width t1 and second cell walls of second width t2 that is greater than the first width t1. The position of the first cell walls alternate with the position of the second cell walls across the honeycomb body transverse to the extrusion direction. In some embodiments, the honeycomb body can comprise one first cell wall to every one second cell wall. In other embodiments, the honeycomb body can comprise at least two second cell walls to every one first cell wall. The ceramic-forming mixture can comprise a ceramic precursor or a ceramic material or both that is transformed or sintered upon firing into a porous ceramic material that comprises cordierite, aluminum titanate, silicon nitride, silicon carbide, mullite, or combinations thereof.

Example embodiments can provide honeycomb structures with both relatively thick and ultrathin walls, which can alternate periodically. Thin walls 208 (and corresponding narrow slot thickness) can be less than 2.5 mil (0.0635 mm) as thin as 1.5 mil (0.038 mm) and the thick walls 212 (and corresponding wide slot thickness) can be 4 mils (0.102 mm) or more, or even 5 mils (0.127 mm) or more. For example, the thick-to-thin web thickness ratio (and corresponding wide-to-narrow slot ratio) can be as high as 1.5 or more, 2 or more, 2.5 or more, 3 or more, or even 4 or more, and can be between 2 and 4, or even between 2.5 and 4, or even 3 and 4 in some embodiments. Further, example embodiments provide apparatus and methods to achieve cell densities of up to 900 cpsi having the above-described nested cell arrangement.

The disclosed extrusion dies can comprise both wide and narrow slots, balancing of impedance, and preventing cross talk between wide slots and narrow slots. Uniform extrusion speed across the extrusion die provides moderate pressure drop and economically efficient extrusion speeds. In the embodiments disclosed herein, different outer surface shapes can be disposed on the same pin to define the different slot geometries. The mid-pin feedholes can provide for control of cross talk, and the impedance plate 460 may provide control of local impedance. A different slot width above and below the first indentation surface feature (e.g., divot) can provide another control means to mitigate cross talk. The narrow slots can comprise a slender plenum structure to reduce flow impedance and reduce web swelling. Inclusion of the first indentation surface features (e.g., divot) in the wide slots can provide a similar impedances as the narrow slots to achieve flow front balance.

Example embodiments of the disclosure are further described below with respect to specific structures thereof, which are illustrative only and not intended to be limiting. In accordance with some of the embodiments, a summary of the extrusion die performance is provided in Table 1. The results are from modeling the velocity distribution at the outlet of the nested structure die having wide slots and thin slots.

TABLE 1

| | Structural Features | | | Performance | |
|---|---|---|---|---|---|
| Run | Plenum | Divot | Impedance Plate | Die pressure (psi) | dV percent (%) |
| 1 | No | No | No | 2006 | 75.4 |
| 2 | Yes | Yes | No | 2234 | 22.9 |
| 3 | Yes | Yes | Yes | 2551 | 9.5 |

Figure 13A:
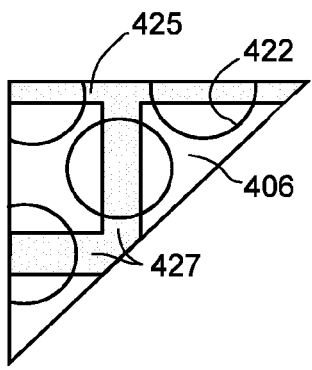
FIGS. 13A, 13B, and 13C illustrate honeycomb extrusion examples corresponding to the results of Runs 1, 2, and 3 in Table 1.
Figure 13B:
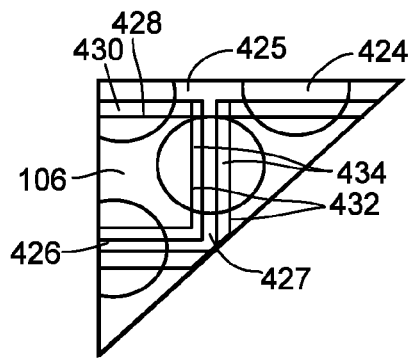
Figure 13C:
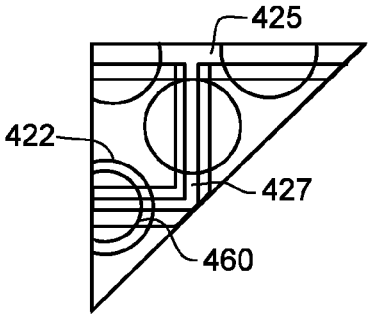

FIGS. 13A, 13B, and 13C correspond to the results of Runs 1, 2, and 3 in Table 1. The parameter dV % is used to determine extrusion performance and represents the flow uniformity at the exit from the extrusion die. The parameter dV % may be defined as:

$$dV\% = (V\max - V\min)/V\text{avg} * 100$$

where the average velocity (Vavg) at the outlet represents extrusion speed and Vmax and Vmin refer to the maximum and minimum velocity at the outlet, respectively. The die pressure (psi) is the pressure across the extrusion die. As Table 1 shows, the combination of features disclosed herein can reduce dV % by about ten times.

FIG. 13A shows the intersection of a wide discharge slot 425 and a narrow discharge slot 427 in a model. Results of a wide discharge slot 425 intersecting a narrow discharge slot 427 is a dV % of 75.4% indicating cross talk and an uneven flow front.

FIG. 13B illustrates the addition of a first indentation surface feature 430 (e.g., divot) in the wide discharge slot 425 shown by first intermediate portion 428 of the outer surfaces of the plurality of pins 406, which comprise the first outlet portions 424. A second indentation surface feature 434 (e.g., plenum) is added to the narrow discharge slots 427 in the model is also shown in FIG. 13B. The plenum is shown by second intermediate portions 432 of the outer surfaces of the plurality of pins 406, which include the second outlet portions 426. Having a first indentation surface feature 430 (e.g., divot) added to the wide discharge slots 425 and a second indentation surface feature 434 (e.g., plenum) added to the narrow discharge slots 427 reduced the dV % to 22.9%, indicating a significant drop in cross talk and a significant improvement in flow front uniformity.

FIG. 13C shows the model with the impedance plate 460 added to the model of FIG. 13B. An impedance hole 464 having a smaller hydraulic diameter than the corresponding feedhole 422 restricts ceramic-forming mixture flow. Having a divot added to the wide discharge slot 425, a plenum added to the narrow discharge slot 427, and the impedance plate 460 to selectively restrict ceramic-forming mixture to predetermined feedholes 422 reduced the dV % to 9.5%, indicating significant drop in cross talk and significant improvement in flow front uniformity. Finally, when the model arrangement illustrated in FIG. 13C was used and the extrusion speed was reduced to 0.5 inch/sec at the die outlet and the inlet pressure was 2132 psi (14.70 MPa), dV % was 7.5%.

Figure 14:
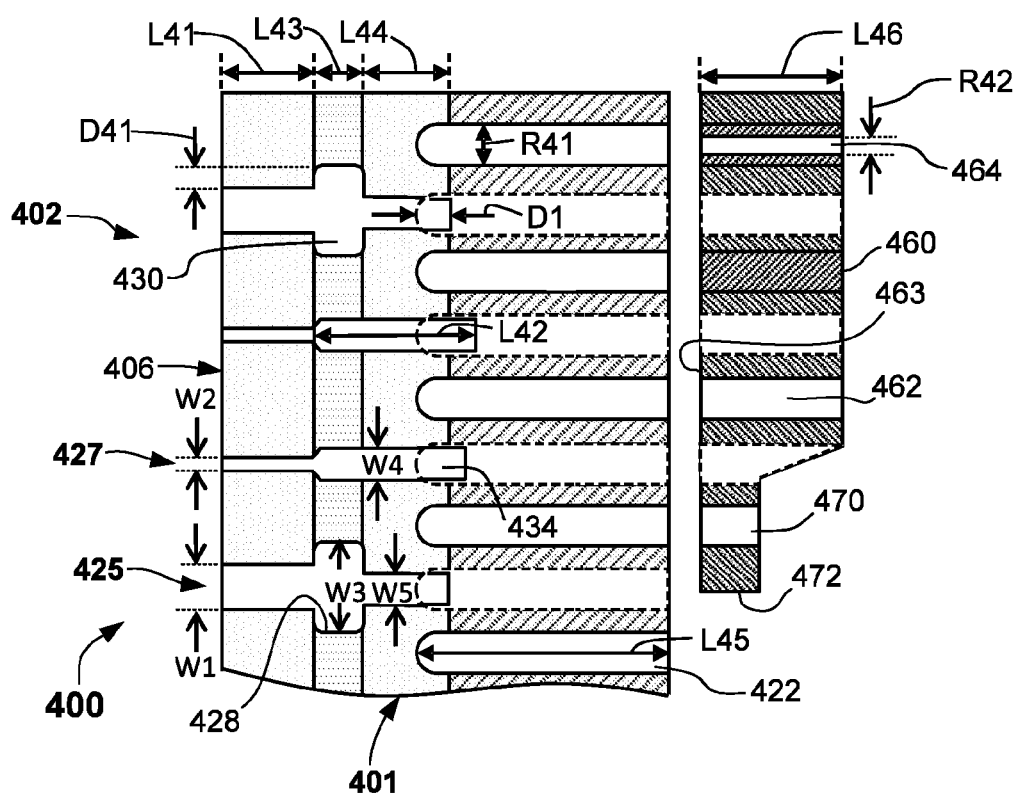
FIG. 14 illustrates a partial schematic cross-section of a honeycomb extrusion die according to embodiments showing example dimensions of components within the honeycomb extrusion die.

Reference is now made to FIG. 14, which shows a partial cross-sectional view of the honeycomb extrusion die 400 with references to different dimensions therein. Table 2 provides example dimensions provided in the honeycomb extrusion die 400 of FIG. 14.

TABLE 2

| Parameter | Nested die for 900/1.5 honeycomb mil (mm) | Nested Die for 750/1.5 Honeycomb mil (mm) |
|---|---|---|
| Narrow slot width (W2) | 1.7 (0.043) | 1.7 (0.043) |
| Narrow slot length (L41) | 30 (0.76) | 30 (0.76) |
| Plenum width (W4) | 3.7 (0.093) | 3.7 (0.093) |
| Plenum length (L42) | 60 (1.5) | 60 (1.5) |
| Center to Center Distance | 37.5 (0.95) | 41 (1.0) |
| Wide slot width (W1) | 5.1 (0.13) | 5.1 (0.13) |
| Wide slot length (L41) | 30 (0.76) | 30 (0.76) |
| Divot depth (D41) | 5 (0.13) | 5 (0.13) |
| Divot length (L43) | 10 (0.25) | 10 (0.25) |
| Divot bottom depth (W5) | 6.8 (0.17) | 8 (0.20) |
| Divot to bottom length (L44) | 50 (1.3) | 50 (1.3) |
| Overlap length (D1) | 35 (0.89) | 35 (0.89) |
| Feedhole radius (R41) | 12 (0.30) | 12 (0.30) |
| Feedhole length (L45) | 900 (22.9) | 900 (22.9) |
| Impedance plate length (L46) | 125 (3.18) | 125 (3.18) |
| Impedance hole Radius (R42) | 9 (0.23) | 10 (0.25) |

The description and drawings show that the feedholes 422 may be located in different positions within the honeycomb extrusion die 400. For example, the feedholes 422 may be located at the intersections of the wide discharge slots 425 and the narrow discharge slots 427 as shown in FIG. 6. The feedholes 422 may be located in the mid sections of wide discharge slots 425 and the narrow discharge slots 427 as shown in FIG. 5. The diameters of the feedholes 422 may vary such that they are different at different locations. For example, the diameters of the feedholes 422 may be varied in addition to or in lieu of the impedance plate 460 of FIG. 11. The feedholes 422 may also have different depths, which can dictate the flow rate through the feedholes 422. For example, short depth feedholes 422 enable less or slower flow than deeper feedholes 422. Examples of feedholes 422 with different depths are shown in FIG. 12.

It will be apparent to those skilled in the art that various modifications and variations can be made in the present disclosure without departing from the scope of the disclosure. Thus, it is intended that the appended claims cover the modifications and variations of this disclosure provided they come within the scope of the appended claims and their equivalents.

The invention claimed is:
1. A honeycomb extrusion die, comprising:
   a die body comprising:
      an inlet face;
      an exit face;
      a plurality of pins disposed on the exit face and arranged to define a matrix of intersecting slots, the intersecting slots comprising wide slots and narrow slots formed between the wide slots, wherein the wide slots have a wide slot exit width greater than a narrow slot exit width of the narrow slots; and
      feedholes at the inlet face and intersecting with inlet portions to at least one of the wide slots and the narrow slots;
   wherein at least some of the pins that define the wide slots comprise a first surface indentation feature that is (i) located between the respective inlet portion and a wide slot exit of the respective wide slot and (ii) spaced away from the wide slot exit; and wherein at least some of the pins that define the narrow slots comprise a second surface indentation feature that is (i) located between the respective inlet portion and a narrow slot exit of the respective narrow slot and (ii) spaced away from the narrow slot exit;

wherein one or more respective wide slots comprise a first portion extending between the respective wide slot exit and the respective first surface indentation feature and a second portion extending between the respective inlet portion of the respective wide slot and the respective first surface indentation feature, wherein a width of the first portion is greater than a width of the second portion.

2. The honeycomb extrusion die of claim 1, wherein the plurality of pins is arranged in a repeating pattern of a plurality of enclosed pin blocks, wherein each enclosed pin block defines respective narrow slots and at least partially defines respective wide slots.

3. The honeycomb extrusion die of claim 2, wherein each enclosed pin block comprises a plurality of respective pins that define a subset of the narrow slots and that do not define any of the wide slots.

4. The honeycomb extrusion die of claim 3, wherein each enclosed pin block further comprises a plurality of respective pins that define both a second subset of the narrow slots and a subset of the wide slots.

5. The honeycomb extrusion die of claim 1, wherein the feedholes comprise first feedholes intersecting respective inlet portions to the wide slots, and second feedholes intersecting respective inlet portions to the narrow slots.

6. The honeycomb extrusion die of claim 1, wherein the first surface indentation features are deeper than the second surface indentation features.

7. The honeycomb extrusion die of claim 1, wherein the first surface indentation feature is spaced away from the wide slot exit and away from the respective inlet portion of the respective wide slot.

8. The honeycomb extrusion die of claim 1, wherein the second surface indentation feature is spaced away from the narrow slot exit and extends to the respective inlet portion of the respective narrow slot.

9. The honeycomb extrusion die of claim 1, wherein at least some of the wide slots intersect with other respective narrow slots along wide-narrow slot intersections.

10. The honeycomb extrusion die of claim 9, wherein the feedholes are spaced away from the wide-narrow slot intersections.

11. The honeycomb extrusion die of claim 1, wherein at least some of the narrow slots intersect with other respective narrow slots along narrow-narrow slot intersections.

12. The honeycomb extrusion die of claim 11, wherein the feedholes are spaced away from the narrow-narrow slot intersections.

13. The honeycomb extrusion die of claim 1, wherein the feedholes are spaced away from intersections between any slot intersections.

14. The honeycomb extrusion die of claim 1, wherein the die body has two respective narrow slots for every respective wide slot.

15. The honeycomb extrusion die of claim 1, wherein the wide slot exit width is three times greater, or more, than the narrow slot exit width.

16. The honeycomb extrusion die of claim 1 wherein the matrix of intersecting wide slots and narrow slots form at least one enclosure of respective wide slots enclosing at least one respective narrow slot.

17. A honeycomb extrusion die, comprising:
a die body comprising:
an inlet face;
an exit face;
a plurality of pins disposed on the exit face and arranged to define a matrix of intersecting slots, the intersecting slots comprising wide slots and narrow slots formed between the wide slots, wherein the wide slots have a wide slot exit width greater than a narrow slot exit width of the narrow slots; and
feedholes at the inlet face and intersecting with inlet portions to at least one of the wide slots and the narrow slots;
wherein at least some of the pins that define the wide slots comprise a first surface indentation feature that is (i) located between the respective inlet portion and the respective wide slot exit of the respective wide slot and (ii) spaced away from the wide slot exit;
wherein at least some of the pins that define the narrow slots comprise a second surface indentation feature that is (i) located between the respective inlet portion and a narrow slot exit of the respective narrow slot and (ii) spaced away from the narrow slot exit; and
wherein the matrix of intersecting wide slots and narrow slots form at least one enclosure of respective wide slots enclosing at least one respective narrow slot,
wherein one or more respective wide slots comprise a first portion extending between the respective wide slot exit and the respective first surface indentation feature and a second portion extending between the respective inlet portion of the respective wide slot and the respective first surface indentation feature, wherein a width of the first portion is greater than a width of the second portion.

18. The honeycomb extrusion die of claim 17, wherein a first group of respective narrow slots in the at least one enclosure extends in a first direction and wherein a second group of respective narrow slots in the at least one enclosure extends in a second direction.

19. An extrusion apparatus comprising:
a honeycomb extrusion die, comprising:
a die body comprising:
an inlet face;
an exit face;
a plurality of pins disposed on the exit face and arranged to define a matrix of intersecting slots, the intersecting slots comprising wide slots and narrow slots formed between the wide slots, wherein the wide slots have a wide slot exit width greater than a narrow slot exit width of the narrow slots;
feedholes at the inlet face and intersecting with inlet portions to at least one of the wide slots and the narrow slots;
an impedance plate disposed adjacent to the inlet face of the die body, wherein the impedance plate comprises:
an entrance face,
an exit face, and
entrance openings in the entrance face extending through the impedance plate to the exit face to form a plurality of impedance holes, wherein at least one respective impedance hole corresponds to at least one respective feedhole in the die body,
wherein at least some of the pins that define the wide slots comprise a first surface indentation feature that is (i) located between the respective inlet portion and a wide slot exit of the respective wide slot and (ii) spaced away from the wide slot exit;

wherein at least some of the pins that define the narrow slots comprise a second surface indentation feature that is (i) located between the respective inlet portion and a narrow slot exit of the respective narrow slot and (ii) spaced away from the narrow slot exit; and wherein one or more respective wide slots comprise a first portion extending between the respective wide slot exit and the respective first surface indentation feature and a second portion extending between the respective inlet portion of the respective wide slot and the respective first surface indentation feature, wherein a width of the first portion is greater than a width of the second portion.

\* \* \* \* \*

UNITED STATES PATENT AND TRADEMARK OFFICE
CERTIFICATE OF CORRECTION

| | |
|---|---|
| PATENT NO. | : 11,534,937 B2 |
| APPLICATION NO. | : 16/955137 |
| DATED | : December 27, 2022 |
| INVENTOR(S) | : Thomas William Brew et al. |

It is certified that error appears in the above-identified patent and that said Letters Patent is hereby corrected as shown below:

In the Specification

In Column 1, Line 13, delete "entirety entireties." and insert -- entireties. --.

Signed and Sealed this
First Day of August, 2023

Katherine Kelly Vidal
*Director of the United States Patent and Trademark Office*